US012638333B2

(12) United States Patent
Oh et al.

(10) Patent No.: US 12,638,333 B2
(45) Date of Patent: May 26, 2026

(54) WELDING INSPECTION APPARATUS INCLUDING THERMAL IMAGING CAMERA

(71) Applicant: LG ENERGY SOLUTION, LTD., Seoul (KR)

(72) Inventors: Hyun Min Oh, Daejeon (KR); Seok Won Jeung, Daejeon (KR); Geon Tae Park, Daejeon (KR); Choon Kwon Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 322 days.

(21) Appl. No.: 18/278,345

(22) PCT Filed: Apr. 21, 2022

(86) PCT No.: PCT/KR2022/005719
§ 371 (c)(1),
(2) Date: Aug. 22, 2023

(87) PCT Pub. No.: WO2022/225345
PCT Pub. Date: Oct. 27, 2022

(65) Prior Publication Data
US 2024/0151589 A1 May 9, 2024

(30) Foreign Application Priority Data

Apr. 21, 2021 (KR) ........................ 10-2021-0051665

(51) Int. Cl.
H01M 50/516 (2021.01)
B23K 31/12 (2006.01)
(Continued)

(52) U.S. Cl.
CPC .......... G01J 5/0859 (2013.01); B23K 31/125 (2013.01); G01J 5/0205 (2013.01);
(Continued)

(58) Field of Classification Search
None
See application file for complete search history.

(56) References Cited

U.S. PATENT DOCUMENTS 7,859,276 B1 * 12/2010 Stevens .............. G01R 31/2848
324/762.01
2007/0047796 A1 * 3/2007 Anantharaman ..... B29C 66/612
228/103
(Continued)

FOREIGN PATENT DOCUMENTS

CN 103339736 A 10/2013
CN 105445668 A 3/2016
(Continued)

OTHER PUBLICATIONS

International Search Report (PCT/ISA/210) issued in PCT/KR2022/005719 mailed on Jul. 26, 2022.
(Continued)

*Primary Examiner* — Erica S Lin
(74) *Attorney, Agent, or Firm* — Birch, Stewart, Kolasch & Birch, LLP

(57) ABSTRACT

Discussed a welding inspection apparatus including a base unit configured to dispose thereon a battery module, as an object to be inspected, a positive electrode connector and a negative electrode connector connected so as to charge and discharge the battery module, a thermal imaging camera configured to photograph a weld portion of the battery module, and a driving unit configured to move the thermal imaging camera, wherein it is possible to determine whether the weld portion is defective using a nondestructive inspection method.

13 Claims, 5 Drawing Sheets

(51) Int. Cl.

| | |
|---|---|
| *G01J 5/02* | (2022.01) |
| *G01J 5/08* | (2022.01) |
| *H01M 50/213* | (2021.01) |
| *H04N 23/23* | (2023.01) |
| *H04N 23/695* | (2023.01) |
| *B23K 101/36* | (2006.01) |
| *G01J 5/00* | (2022.01) |

(52) U.S. Cl.

CPC ....... *H01M 50/213* (2021.01); *H01M 50/516* (2021.01); *H04N 23/23* (2023.01); *H04N 23/695* (2023.01); *B23K 2101/36* (2018.08); *G01J 2005/0077* (2013.01)

(56) References Cited

U.S. PATENT DOCUMENTS

| | | | |
|---|---|---|---|
| 2011/0108181 A1* | 5/2011 | Cai | ......................... B29C 65/08 228/104 |
| 2011/0256430 A1* | 10/2011 | Stancu | ................. B23K 31/125 429/50 |
| 2012/0070721 A1* | 3/2012 | Han | .................... H01M 50/538 429/163 |
| 2013/0006565 A1 | 1/2013 | Matsumoto | |
| 2014/0321498 A1 | 10/2014 | Matsumoto et al. | |
| 2017/0025316 A1 | 1/2017 | Middendorf et al. | |
| 2021/0278479 A1 | 9/2021 | Park et al. | |

FOREIGN PATENT DOCUMENTS

| | | | |
|---|---|---|---|
| CN | 205900713 | U | 1/2017 |
| CN | 109813765 | A | 5/2019 |
| EP | 2 421 052 | A2 | 2/2012 |
| JP | 2006-253057 | A | 9/2006 |
| JP | 2008-26113 | A | 2/2008 |
| JP | 2011-191232 | A | 9/2011 |
| JP | 2014-215212 | A | 11/2014 |
| JP | 2015-10944 | A | 1/2015 |
| JP | 2015-109148 | A | 6/2015 |
| JP | 2017-511000 | A | 4/2017 |
| JP | 2020-140824 | A | 9/2020 |
| KR | 10-2010-0115153 | A | 10/2010 |
| KR | 10-2011-0115967 | A | 10/2011 |
| KR | 10-2018-0038672 | A | 4/2018 |
| KR | 10-2020-0102777 | A | 9/2020 |
| WO | WO 2018/074161 | A1 | 4/2018 |
| WO | WO 2019/145976 | A1 | 8/2019 |

OTHER PUBLICATIONS

Extended European Search Report for European Application No. 22792043.6, dated Sep. 16, 2024.

Li et al., "LED Thermal Management and Heat-Dissipation Technology Applications," LED Thermal Management Series, Shanghai Scientific & Technical Publishers, Sep. 2018, 9 pages total.

* cited by examiner

【FIG. 1】
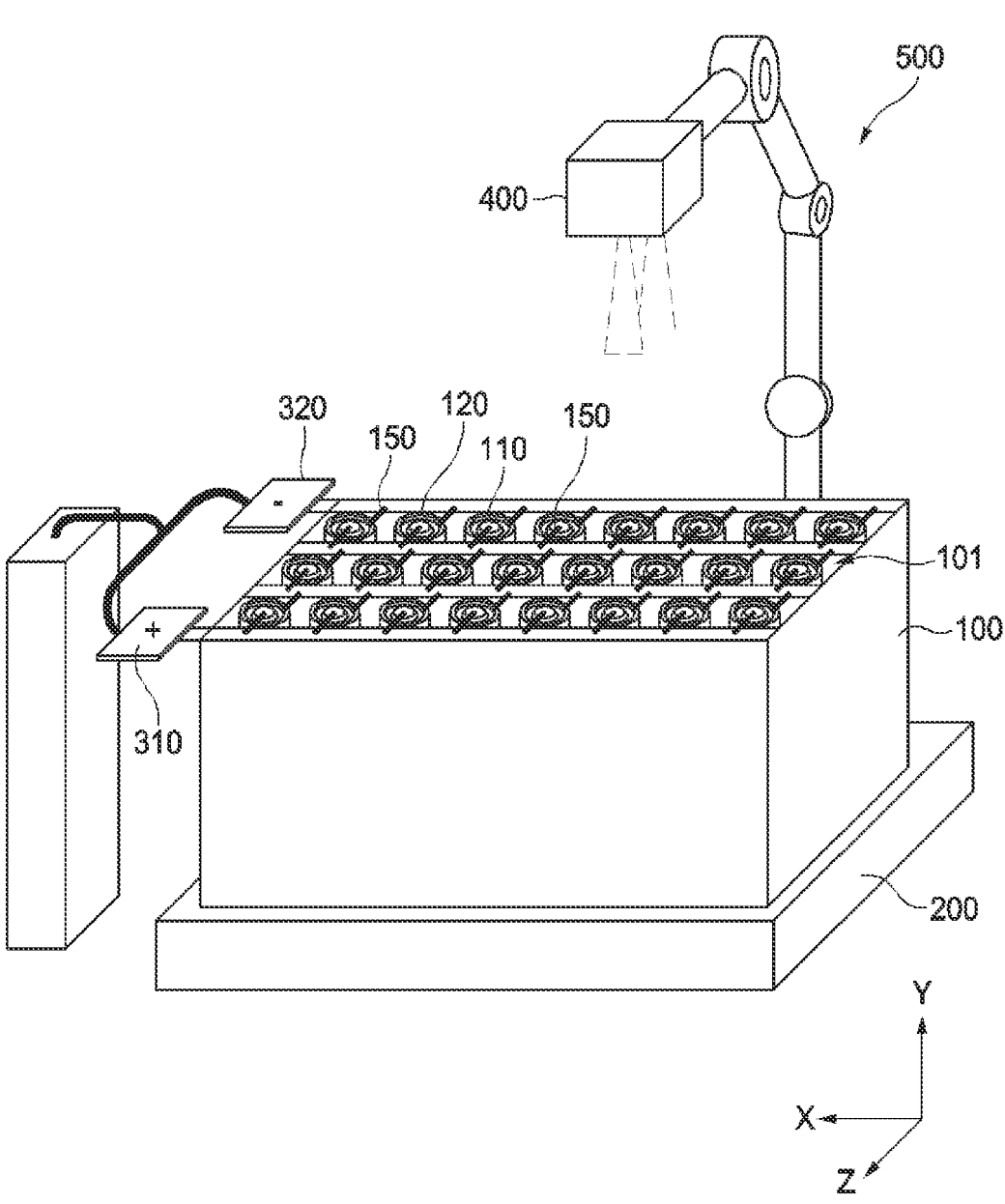

【FIG. 2】
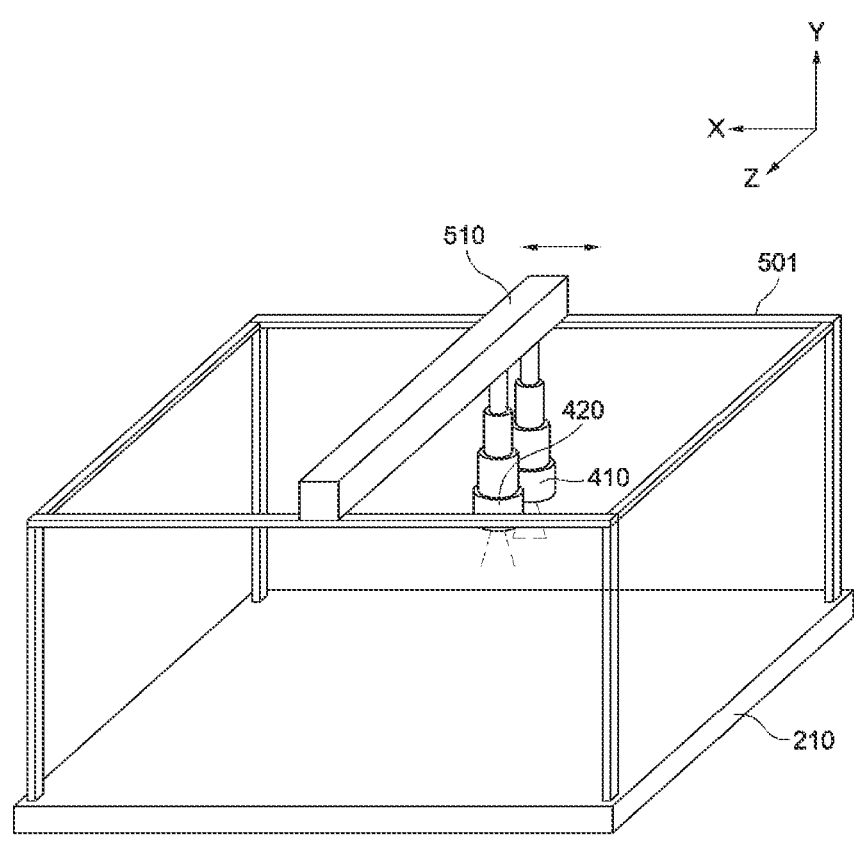
【FIG. 3】
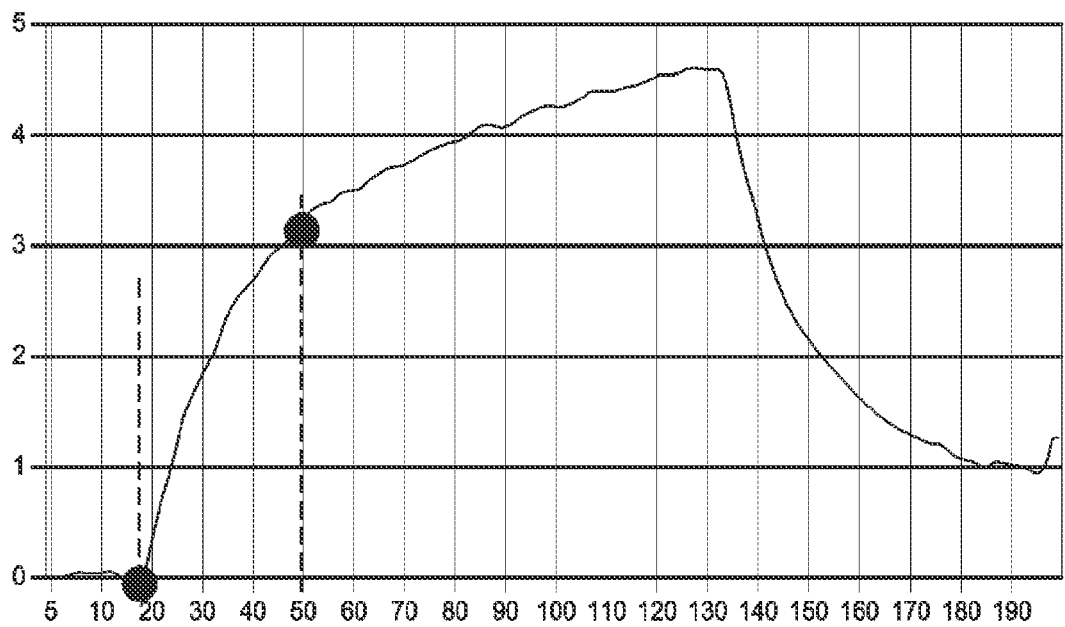

[FIG. 4]
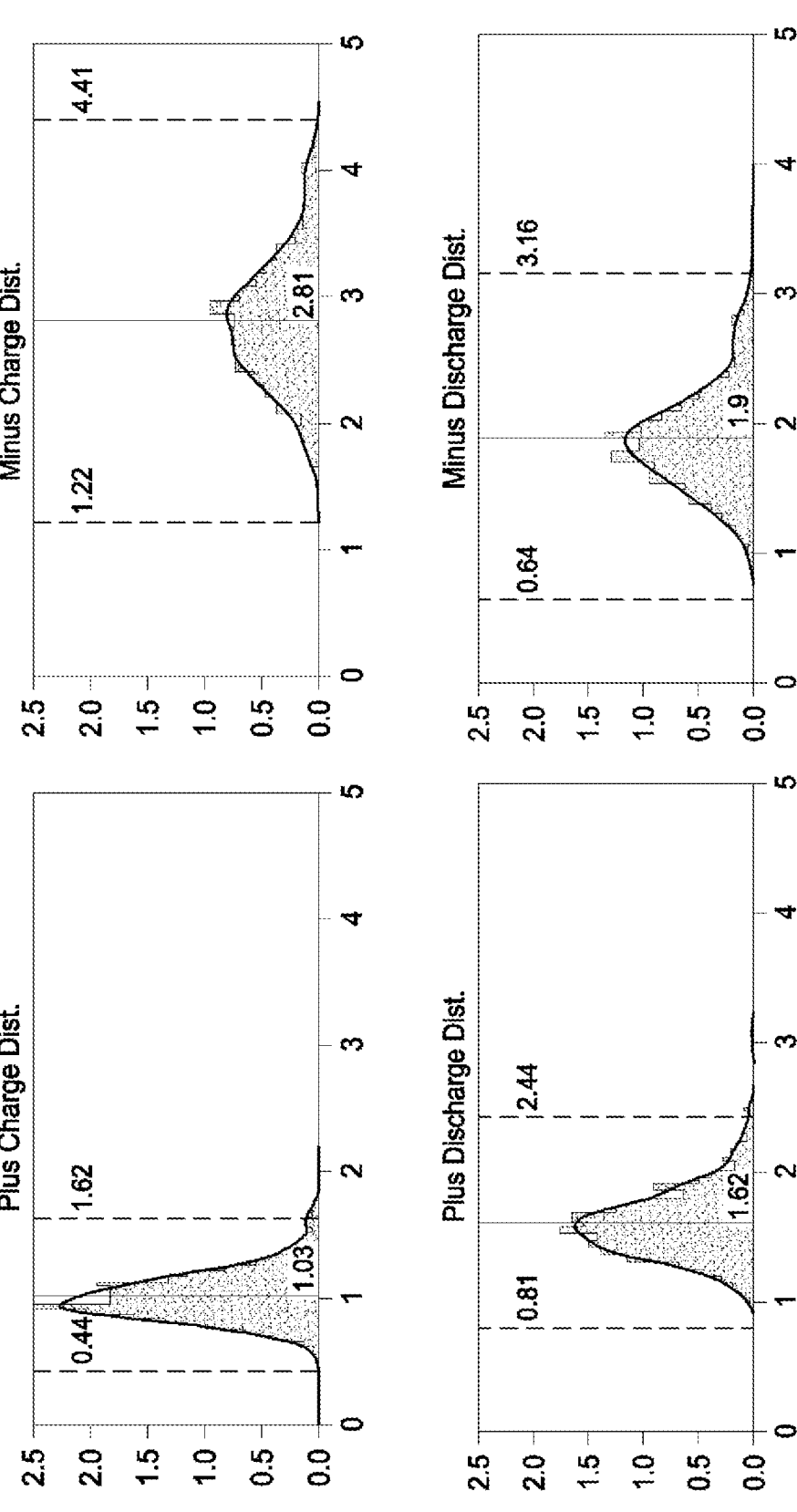

[FIG. 5]

| | | 10Chg | 10Dsg | 20Chg | 20Dsg | 30Chg | 30Dsg | 40Chg | 40Dsg | 50Chg | 50Dsg | 60Chg | 60Dsg | 70Chg | 70Dsg | 80Chg | 80Dsg | 90Chg | 90Dsg | 100Chg | 100Dsg |
|---|---|---|---|---|---|---|---|---|---|---|---|---|---|---|---|---|---|---|---|---|---|
| First Camera | Cell 1 | 2.46 | 1.59 | 2.58 | 1.66 | 2.40 | 1.54 | 2.50 | 1.61 | 2.38 | 1.80 | 2.76 | 1.77 | 2.73 | 1.72 | 2.54 | 1.59 | 2.49 | 1.67 | 2.57 | 1.77 |
| | Cell 2 | 2.36 | 1.43 | 2.24 | 1.51 | 2.41 | 1.62 | 2.22 | 1.48 | 2.35 | 1.44 | 2.60 | 1.58 | 2.47 | 1.44 | 2.44 | 1.48 | 2.30 | 1.62 | 2.37 | 1.55 |
| | Cell 3 | 2.66 | 1.90 | 2.75 | 1.86 | 2.73 | 1.98 | 2.59 | 1.92 | 2.97 | 1.96 | 3.04 | 2.01 | 3.07 | 2.14 | 2.79 | 1.96 | 3.01 | 1.98 | 2.90 | 1.91 |
| | Cell 4 | 2.75 | 1.90 | 2.76 | 1.87 | 2.86 | 2.02 | 2.67 | 2.10 | 2.79 | 2.04 | 2.96 | 2.16 | 2.74 | 2.03 | 2.90 | 1.95 | 2.85 | 2.12 | 2.92 | 2.06 |
| | Cell 5 | 2.17 | 1.45 | 2.39 | 1.43 | 2.25 | 1.44 | 2.29 | 1.46 | 2.28 | 1.43 | 2.54 | 1.42 | 2.33 | 1.49 | 2.35 | 1.53 | 2.35 | 1.50 | 2.35 | 1.43 |
| | Cell 6 | 2.45 | 1.64 | 2.54 | 1.66 | 2.42 | 1.72 | 2.46 | 1.79 | 2.45 | 1.77 | 2.78 | 1.69 | 2.68 | 1.63 | 2.54 | 1.75 | 2.56 | 1.78 | 2.54 | 1.72 |
| | Cell 7 | 2.23 | 1.43 | 2.32 | 1.34 | 2.33 | 1.39 | 2.20 | 1.55 | 2.38 | 1.41 | 2.56 | 1.57 | 2.39 | 1.49 | 2.41 | 1.54 | 2.28 | 1.40 | 2.30 | 1.49 |
| | Cell 8 | 3.50 | 1.94 | 2.97 | 1.78 | 2.96 | 1.93 | 2.91 | 2.05 | 2.90 | 1.86 | 3.27 | 2.13 | 3.01 | 1.94 | 2.90 | 1.86 | 2.94 | 1.80 | 2.94 | 1.91 |
| | Cell 9 | 2.91 | 1.98 | 2.98 | 1.82 | 3.01 | 1.93 | 2.86 | 2.00 | 3.03 | 1.82 | 3.16 | 2.08 | 2.94 | 1.89 | 3.00 | 1.93 | 3.15 | 1.91 | 3.17 | 1.98 |
| | Cell 10 | 3.24 | 1.95 | 3.27 | 2.14 | 3.26 | 2.08 | 3.18 | 2.29 | 3.45 | 2.23 | 3.52 | 2.26 | 3.46 | 2.17 | 3.47 | 2.16 | 3.34 | 2.23 | 3.50 | 2.28 |
| | Cell 11 | 2.78 | 1.83 | 2.94 | 1.72 | 2.73 | 1.94 | 2.76 | 1.82 | 3.10 | 1.76 | 3.12 | 2.00 | 3.09 | 2.00 | 2.99 | 1.89 | 2.91 | 2.17 | 3.05 | 1.92 |
| | Cell 12 | 2.73 | 1.82 | 2.87 | 1.80 | 2.69 | 1.78 | 2.75 | 1.84 | 2.85 | 1.79 | 3.09 | 1.97 | 2.65 | 1.76 | 2.81 | 1.76 | 2.96 | 1.89 | 2.66 | 1.81 |
| | Cell 13 | 3.81 | 2.69 | 3.75 | 2.67 | 3.65 | 2.79 | 3.51 | 2.86 | 3.79 | 2.60 | 4.05 | 2.94 | 3.99 | 2.78 | 3.90 | 2.74 | 3.74 | 2.77 | 3.75 | 2.70 |
| | Cell 14 | 4.00 | 2.74 | 3.87 | 2.73 | 3.97 | 2.74 | 3.93 | 2.82 | 3.99 | 2.93 | 4.31 | 3.00 | 4.08 | 2.81 | 4.01 | 2.93 | 4.00 | 2.91 | 4.06 | 2.86 |
| | Cell 15 | 4.00 | 2.64 | 3.82 | 2.52 | 3.71 | 2.75 | 3.64 | 2.76 | 3.65 | 2.69 | 3.99 | 2.71 | 3.73 | 2.65 | 3.74 | 2.57 | 3.66 | 2.61 | 3.68 | 2.65 |
| | Cell 16 | 4.04 | 2.80 | 4.09 | 2.64 | 4.05 | 2.83 | 3.80 | 2.83 | 3.97 | 2.68 | 4.38 | 2.94 | 4.24 | 2.76 | 3.88 | 2.67 | 3.94 | 2.80 | 4.13 | 2.60 |
| Second Camera | Cell 1 | 3.01 | 2.11 | 2.90 | 2.07 | 2.86 | 2.03 | 2.38 | 2.00 | 2.92 | 2.00 | 2.99 | 1.94 | 2.97 | 2.04 | 3.12 | 2.01 | 2.90 | 1.93 | 3.02 | 1.82 |
| | Cell 2 | 2.34 | 1.64 | 2.23 | 1.61 | 2.30 | 1.60 | 1.90 | 1.67 | 2.26 | 1.74 | 2.46 | 1.53 | 2.34 | 1.68 | 2.55 | 1.70 | 2.31 | 1.64 | 2.42 | 1.46 |
| | Cell 3 | 1.91 | 1.34 | 1.83 | 1.17 | 1.77 | 1.23 | 1.44 | 1.39 | 1.87 | 1.39 | 2.03 | 1.22 | 1.97 | 1.29 | 2.10 | 1.39 | 1.99 | 1.27 | 1.98 | 1.21 |
| | Cell 4 | 1.70 | 1.32 | 1.74 | 1.32 | 1.74 | 1.29 | 1.42 | 1.24 | 1.72 | 1.17 | 1.94 | 1.08 | 1.80 | 1.28 | 1.86 | 1.39 | 1.80 | 1.26 | 1.81 | 1.23 |
| | Cell 5 | 2.98 | 2.05 | 2.75 | 2.06 | 2.64 | 1.88 | 2.47 | 2.01 | 3.04 | 2.14 | 2.90 | 2.06 | 2.83 | 2.08 | 2.89 | 2.02 | 2.73 | 2.12 | 2.93 | 1.71 |
| | Cell 6 | 2.97 | 2.07 | 2.76 | 1.97 | 2.81 | 1.61 | 2.46 | 2.03 | 2.87 | 2.02 | 2.94 | 2.03 | 2.62 | 2.04 | 2.98 | 2.04 | 2.61 | 2.05 | 2.87 | 1.80 |
| | Cell 7 | 2.20 | 1.33 | 2.14 | 1.44 | 2.20 | 1.42 | 1.74 | 1.47 | 2.21 | 1.40 | 2.42 | 1.34 | 2.21 | 1.39 | 2.25 | 1.48 | 2.24 | 1.40 | 2.15 | 1.32 |
| | Cell 8 | 3.14 | 1.91 | 2.78 | 1.92 | 2.75 | 1.86 | 2.39 | 2.05 | 3.08 | 1.95 | 2.99 | 1.92 | 2.85 | 2.09 | 2.96 | 2.01 | 3.05 | 1.98 | 2.87 | 1.81 |
| | Cell 9 | 2.58 | 1.63 | 2.41 | 1.47 | 2.41 | 1.56 | 2.17 | 1.65 | 2.61 | 1.80 | 2.46 | 1.71 | 2.58 | 1.84 | 2.75 | 1.50 | 2.66 | 1.64 | 2.52 | 1.47 |
| | Cell 10 | 2.90 | 1.85 | 3.00 | 1.88 | 2.88 | 1.71 | 2.51 | 2.00 | 2.82 | 1.96 | 3.03 | 1.74 | 3.03 | 1.87 | 3.14 | 2.02 | 3.03 | 1.87 | 3.04 | 1.80 |
| | Cell 11 | 3.25 | 2.28 | 3.11 | 2.25 | 3.10 | 2.18 | 2.67 | 2.25 | 3.29 | 2.18 | 3.31 | 2.15 | 3.32 | 2.32 | 3.48 | 2.25 | 3.50 | 2.25 | 3.17 | 2.10 |
| | Cell 12 | 2.96 | 1.98 | 2.93 | 2.03 | 2.94 | 2.04 | 3.04 | 2.02 | 2.98 | 2.70 | 3.07 | 2.84 | 2.96 | 2.00 | 3.06 | 3.22 | 3.98 | 2.03 | 2.99 | 1.94 |
| | Cell 13 | 4.84 | 3.55 | 4.17 | 3.35 | 4.26 | 3.61 | 3.80 | 3.54 | 4.61 | 3.51 | 4.63 | 3.47 | 4.37 | 3.84 | 4.68 | 3.53 | 4.54 | 3.69 | 4.47 | 3.35 |
| | Cell 14 | 3.80 | 2.09 | 3.07 | 2.10 | 3.04 | 1.93 | 2.44 | 2.00 | 3.21 | 2.18 | 3.30 | 1.87 | 2.98 | 2.04 | 3.07 | 2.14 | 3.05 | 1.92 | 2.93 | 1.93 |
| | Cell 15 | 4.37 | 2.90 | 3.99 | 2.88 | 3.76 | 2.78 | 3.25 | 2.73 | 4.04 | 2.78 | 4.16 | 2.73 | 4.02 | 2.85 | 4.15 | 2.84 | 3.95 | 2.78 | 3.86 | 2.57 |
| | Cell 16 | 4.35 | 3.09 | 3.94 | 2.88 | 3.98 | 2.84 | 3.34 | 2.86 | 4.17 | 2.79 | 4.14 | 2.86 | 3.95 | 2.95 | 3.99 | 2.91 | 3.95 | 3.05 | 3.94 | 2.79 |

Chg=Charging; Dsg=Discharging

[FIG. 6]

| | | 1Chg | 1Dsg | 2Chg | 2Dsg | 3Chg | 3Dsg | 4Chg | 4Dsg | 5Chg | 5Dsg | 6Chg | 6Dsg | 7Chg | 7Dsg | 8Chg | 8Dsg | 9Chg | 9Dsg | 10Chg | 10Dsg |
|---|---|---|---|---|---|---|---|---|---|---|---|---|---|---|---|---|---|---|---|---|---|
| First Camera | Cell 1 | 1.16 | 1.45 | 0.85 | 1.40 | 0.85 | 1.35 | 0.83 | 1.26 | 0.84 | 1.34 | 0.94 | 1.37 | 0.73 | 1.33 | 0.91 | 1.52 | 0.72 | 2.24 | 2.01 | 2.33 |
| | Cell 2 | 1.33 | 1.58 | 0.92 | 1.55 | 1.03 | 1.57 | 1.15 | 1.52 | 1.18 | 1.60 | 1.10 | 1.53 | 0.97 | 1.57 | 1.12 | 1.55 | 0.84 | 1.37 | 1.13 | 1.38 |
| | Cell 3 | 1.06 | 1.40 | 0.77 | 1.60 | 0.84 | 1.41 | 0.94 | 1.47 | 0.92 | 1.43 | 0.93 | 1.55 | 0.75 | 1.44 | 0.87 | 1.60 | 0.71 | 1.39 | 0.93 | 1.38 |
| | Cell 4 | 1.35 | 1.42 | 1.01 | 1.61 | 1.06 | 1.50 | 0.87 | 1.75 | 0.97 | 1.70 | 0.99 | 1.78 | 0.84 | 1.65 | 1.07 | 1.59 | 0.73 | 1.56 | 0.99 | 1.54 |
| | Cell 5 | 0.98 | 1.43 | 0.91 | 1.41 | 0.82 | 1.31 | 0.83 | 1.27 | 0.79 | 1.30 | 0.96 | 1.46 | 0.76 | 1.51 | 0.75 | 1.57 | 0.66 | 1.17 | 0.86 | 1.27 |
| | Cell 6 | 1.28 | 1.60 | 0.99 | 1.78 | 0.97 | 1.78 | 1.05 | 1.59 | 1.12 | 1.79 | 1.20 | 1.69 | 0.93 | 1.76 | 1.09 | 1.87 | 0.83 | 1.57 | 1.12 | 1.57 |
| | Cell 7 | 1.11 | 1.46 | 0.95 | 1.61 | 0.96 | 1.56 | 0.89 | 1.55 | 0.91 | 1.53 | 1.00 | 1.53 | 0.93 | 1.52 | 0.99 | 1.67 | 0.80 | 1.39 | 1.03 | 1.37 |
| | Cell 8 | 1.19 | 1.71 | 0.93 | 1.84 | 1.05 | 1.70 | 1.06 | 1.66 | 1.05 | 1.66 | 0.99 | 1.68 | 0.89 | 1.75 | 1.21 | 1.77 | 0.85 | 1.56 | 1.17 | 1.71 |
| | Cell 9 | 1.42 | 1.79 | 0.99 | 1.99 | 1.14 | 2.03 | 1.14 | 1.81 | 1.06 | 1.78 | 1.11 | 1.91 | 0.98 | 1.80 | 1.11 | 1.88 | 0.85 | 1.66 | 1.18 | 1.66 |
| | Cell 10 | 1.63 | 1.86 | 1.17 | 1.92 | 1.24 | 1.84 | 1.27 | 1.77 | 1.28 | 1.81 | 1.29 | 1.98 | 1.18 | 1.87 | 1.32 | 1.93 | 0.89 | 1.74 | 1.35 | 1.68 |
| | Cell 11 | 1.25 | 1.87 | 1.06 | 1.84 | 1.02 | 1.86 | 1.16 | 1.81 | 1.09 | 1.87 | 1.13 | 1.85 | 1.03 | 1.86 | 1.18 | 1.93 | 0.87 | 1.72 | 1.24 | 1.72 |
| | Cell 12 | 1.47 | 1.96 | 1.15 | 1.98 | 1.18 | 2.01 | 1.07 | 1.83 | 1.19 | 2.13 | 1.21 | 1.93 | 1.16 | 1.95 | 1.20 | 1.97 | 0.96 | 1.66 | 1.25 | 1.76 |
| | Cell 13 | 1.16 | 1.48 | 0.95 | 1.54 | 1.01 | 1.62 | 0.92 | 1.52 | 0.95 | 1.55 | 0.98 | 1.60 | 0.83 | 1.52 | 0.94 | 1.62 | 0.73 | 1.39 | 0.90 | 1.53 |
| | Cell 14 | 1.54 | 1.97 | 1.30 | 2.12 | 1.37 | 2.00 | 1.15 | 1.95 | 1.29 | 2.08 | 1.25 | 2.16 | 1.12 | 2.16 | 1.21 | 2.08 | 1.00 | 1.71 | 1.33 | 1.81 |
| | Cell 15 | 1.40 | 1.90 | 1.06 | 1.90 | 1.16 | 1.97 | 1.14 | 1.80 | 1.20 | 1.80 | 1.37 | 1.88 | 1.14 | 1.91 | 1.19 | 2.00 | 0.99 | 1.76 | 1.22 | 1.72 |
| | Cell 16 | 1.41 | 1.74 | 0.98 | 1.76 | 1.00 | 1.80 | 1.19 | 1.85 | 1.10 | 1.91 | 1.18 | 1.77 | 0.97 | 1.97 | 1.09 | 1.83 | 0.83 | 1.60 | 1.16 | 1.83 |
| Second Camera | Cell 1 | 1.12 | 1.34 | 1.02 | 1.38 | 0.94 | 1.27 | 1.00 | 1.42 | 0.75 | 1.28 | 0.95 | 1.46 | 1.04 | 1.42 | 1.01 | 1.43 | 0.91 | 1.28 | 1.07 | 1.41 |
| | Cell 2 | 0.80 | 1.20 | 0.79 | 1.16 | 0.78 | 1.21 | 0.79 | 1.21 | 0.63 | 1.16 | 0.73 | 1.27 | 0.89 | 1.19 | 0.77 | 1.19 | 0.88 | 1.20 | 0.72 | 1.21 |
| | Cell 3 | 1.03 | 1.31 | 0.96 | 1.37 | 0.95 | 1.36 | 1.01 | 1.34 | 0.85 | 1.47 | 0.96 | 1.47 | 0.99 | 1.35 | 0.95 | 1.40 | 0.96 | 1.41 | 0.88 | 1.45 |
| | Cell 4 | 1.04 | 1.42 | 1.11 | 1.38 | 1.05 | 1.49 | 0.83 | 1.44 | 0.75 | 1.45 | 1.00 | 1.46 | 0.97 | 1.51 | 1.05 | 1.49 | 0.97 | 1.40 | 1.02 | 1.49 |
| | Cell 5 | 0.71 | 1.31 | 1.00 | 1.24 | 0.71 | 1.33 | 0.80 | 1.39 | 0.69 | 1.31 | 0.79 | 1.36 | 0.84 | 1.34 | 0.89 | 1.41 | 0.78 | 1.42 | 0.82 | 1.34 |
| | Cell 6 | 0.98 | 1.48 | 1.01 | 1.42 | 0.98 | 1.63 | 0.96 | 1.55 | 0.86 | 1.47 | 0.95 | 1.63 | 1.15 | 1.62 | 0.95 | 1.55 | 0.98 | 1.49 | 1.04 | 1.54 |
| | Cell 7 | 0.87 | 1.30 | 0.84 | 1.26 | 0.77 | 1.41 | 0.81 | 1.35 | 0.73 | 1.29 | 0.78 | 1.41 | 0.77 | 1.47 | 0.84 | 1.33 | 0.79 | 1.33 | 0.88 | 1.35 |
| | Cell 8 | 0.93 | 1.36 | 0.89 | 1.28 | 0.92 | 1.43 | 0.76 | 1.44 | 0.79 | 1.36 | 0.95 | 1.38 | 0.94 | 1.52 | 0.89 | 1.45 | 0.82 | 1.42 | 0.83 | 1.48 |
| | Cell 9 | 1.09 | 1.97 | 1.41 | 1.97 | 1.42 | 2.04 | 1.40 | 1.96 | 1.35 | 1.90 | 1.43 | 2.09 | 1.42 | 2.00 | 1.40 | 2.04 | 1.30 | 1.86 | 1.43 | 2.00 |
| | Cell 10 | 0.95 | 2.02 | 1.34 | 1.93 | 1.32 | 1.97 | 1.26 | 1.87 | 1.24 | 1.96 | 1.30 | 1.91 | 1.33 | 2.03 | 1.31 | 1.99 | 1.23 | 1.93 | 1.24 | 1.97 |
| | Cell 11 | 0.60 | 1.68 | 0.99 | 1.61 | 0.91 | 1.60 | 0.90 | 1.52 | 0.84 | 1.60 | 0.97 | 1.63 | 1.07 | 1.70 | 0.99 | 1.74 | 1.06 | 1.64 | 1.03 | 1.67 |
| | Cell 12 | 0.66 | 1.81 | 1.14 | 1.66 | 1.02 | 1.73 | 1.02 | 1.64 | 0.95 | 1.71 | 1.05 | 1.66 | 1.11 | 1.69 | 1.21 | 1.79 | 0.94 | 1.85 | 0.97 | 1.81 |
| | Cell 13 | 0.99 | 2.07 | 1.39 | 1.60 | 1.27 | 1.96 | 1.35 | 2.00 | 1.13 | 1.95 | 1.40 | 1.88 | 1.49 | 1.96 | 1.51 | 1.98 | 1.39 | 1.97 | 1.32 | 1.97 |
| | Cell 14 | 0.90 | 1.89 | 1.24 | 1.72 | 1.14 | 1.99 | 1.16 | 2.00 | 1.12 | 1.89 | 1.24 | 2.04 | 1.22 | 2.10 | 1.24 | 2.00 | 1.13 | 1.87 | 1.22 | 1.98 |
| | Cell 15 | 0.90 | 2.26 | 1.66 | 2.30 | 1.60 | 2.42 | 1.57 | 2.37 | 1.63 | 2.52 | 1.84 | 2.33 | 1.82 | 2.32 | 1.72 | 2.49 | 1.89 | 2.29 | 1.60 | 2.50 |
| | Cell 16 | 0.83 | 1.86 | 1.36 | 1.62 | 1.06 | 1.78 | 1.01 | 1.80 | 1.10 | 1.92 | 1.20 | 1.74 | 1.09 | 1.72 | 1.12 | 1.74 | 1.19 | 1.73 | 1.09 | 1.77 |

Chg=Charging; Dsg=Discharging

WELDING INSPECTION APPARATUS INCLUDING THERMAL IMAGING CAMERA

TECHNICAL FIELD

This application claims the benefit of priority to Korean Patent Application No. 2021-0051665 filed on Apr. 21, 2021, the disclosure of which is incorporated herein by reference in its entirety.

TECHNICAL FIELD

This application claims the benefit of priority to Korean Patent Application No. 2021-0051665 filed on Apr. 21, 2021, the disclosure of which is incorporated herein by reference in its entirety.

The present invention relates to a welding inspection apparatus using a thermal imaging camera. More particularly, the present invention relates to a welding inspection apparatus including a thermal imaging camera capable of determining whether there are weld defects of battery cells constituting a battery module using a nondestructive inspection method.

BACKGROUND ART

Improvement in safety and increase in capacity of a lithium secondary battery, which is capable of being charged and discharged, have been rapidly achieved, and kinds of devices that use the lithium secondary battery as an energy source have been increased.

For example, the lithium secondary battery has been widely used as an energy source for wireless mobile devices, which are small multifunctional products, or wearable devices, which are worn on the body, and has also been used as an energy source for electric vehicles and hybrid electric vehicles presented as alternatives to existing gasoline and diesel vehicles, which cause air pollution, or as an energy storage system (ESS).

Based on the shape of a battery case, the lithium secondary battery is classified into a cylindrical secondary battery having an electrode assembly mounted in a cylindrical metal can, a prismatic secondary battery having an electrode assembly mounted in a prismatic metal can, or a pouch-shaped secondary battery having an electrode assembly mounted in a pouch-shaped case made of an aluminum laminate sheet. Thereamong, the cylindrical secondary battery has advantages of a relatively large capacity and structural stability.

In order to manufacture medium and large battery packs, a process of electrically connecting a plurality of cylindrical battery cells is necessary. For example, positive electrode terminals and negative electrode terminals of the cylindrical battery cells may be connected to each other by wire bonding.

If wires are coupled to the positive electrode terminals and negative electrode terminals by weak welding when wire bonding is used, the wires may be easily separated from the positive electrode terminals and negative electrode terminals even by small force, since the coupling force of the wires is weak.

Consequently, it is necessary to check the weld state of wire-bonded weld portions in advance in order to prevent occurrence of such a problem.

In connection therewith, Patent Document 1 discloses a poor contact detection apparatus using the fact that output voltage of a secondary battery module is reduced or defects, such as heat generation, occur due to arc discharge or increase in contact resistance when poor contact occurs between electrode terminals of battery cells and busbars, wherein the poor contact detection apparatus includes a total voltage acquisition unit configured to acquire total voltage of the secondary battery module, an individual voltage acquisition unit configured to acquire voltage of each of a plurality of battery cells constituting the secondary battery module, and a poor contact determination unit configured to determine whether poor contact has occurred at connection portions of the battery cells based on the difference between the sum of the voltages acquired by the individual voltage acquisition unit and the voltage acquired by the total voltage acquisition unit.

In Patent Document 1, a thermistor, which is a temperature sensor, is used in order to determine whether arc discharge has occurred in the battery cell in the battery module, and a method of determining whether contact at the connection portion between the electrode terminal and the busbar is poor is proposed. Consequently, Patent Document 1 does not propose a method of determining poor contact when electrode terminals are coupled to each other by wire bonding.

Patent Document 2 relates to a method of determining whether micro-diameter wire bonding is good or poor based on the joint area of a joint, the method including a heating process of heating the micro-diameter wire using a laser having a microscopic spot diameter, a temperature measurement process of correcting emissivity of a very small amount of infrared light emitted from a portion that is heated of the micro-diameter wire joint to measure temperature variation at a high speed, a correction process of correcting the result of measurement in the temperature measurement process with respect to an absorption rate of the laser, and a good or poor determination process of comparing and selecting values related to temperature variation after correction or the joint area obtained from the temperature variation based on the measured temperature corrected in the correction process to determine whether bonding is good Or poor.

In Patent Document 2, the process of heating the micro-diameter wire using the laser having the microscopic spot diameter in order to measure the temperature of the joint joined by wire bonding, the process of correcting the result of measurement in the temperature measurement process with respect to the absorption rate of the laser, and the process of comparing and selecting the values related to the joint area of the joint are included. As a result, an additional device, such as a laser, is necessary, and the method of determining whether wire bonding is good or poor is complicated.

Therefore, there is a need for technology capable of easily determining whether, in a battery module including battery cells electrically connected to each other by wire bonding, contact of an electrode terminal weld portion is defective.

(Patent Document 1) Japanese Patent Application Publication No. 2015-109148 (2015 Jun. 11)

(Patent Document 2) Japanese Patent Application Publication No. 2011-191232 (2011 Sep. 29)

DISCLOSURE

Technical Problem

The present invention has been made in view of the above problems, and it is an object of the present invention to provide a welding inspection apparatus including a thermal imaging camera capable of easily determining whether the portion of an electrode terminal to which a wire is coupled is defective in a battery module including battery cells connected to each other by wire bonding.

Technical Solution

A welding inspection apparatus according to the present invention to accomplish the above object includes a base unit configured to dispose thereon a battery module, as an object to be inspected, a positive electrode connector and a negative electrode connector connected so as to charge and discharge the battery module, a thermal imaging camera configured to photograph a weld portion of the battery module, and a driving unit configured to move the thermal imaging camera.

The battery module may include battery cells.

The battery cells may be electrically connected to each other by a wire bonding, and the thermal imaging camera may measure the temperature of the weld portion at each of a positive electrode terminal and a negative electrode terminal of each of the battery cells.

The battery module may be charged and discharged two or more times.

The thermal imaging camera may be provided in two or more so as to be disposed adjacent to each other.

The thermal imaging camera may be moved by the driving unit in three axis directions including an x-axis direction, a y-axis direction, and a z-axis direction.

The thermal imaging camera may photograph the weld portion while moving above the battery module in the state in which the battery module is disposed on the base unit.

A difference image algorithm may be used as a method of determining whether the temperature of the weld portion measured by the thermal imaging camera is within a normal temperature range.

The normal temperature range may be derived based on a temperature difference between a frame having no temperature increase and a specific frame, among frames measured by the thermal imaging camera.

The specific frame may be a frame having a sudden temperature change, among all frames.

A normal charge range and a normal discharge range may be derived from each of a positive electrode weld portion and a negative electrode weld portion as the normal temperature range. Also, the battery cells may be cylindrical.

In addition, the present invention may provide various combinations of the above solving means.

Advantageous Effects

As is apparent from the above description, a welding inspection apparatus according to the present invention is capable of determining whether a weld portion is defective through a method of observing the external appearance of a battery module using a thermal imaging camera, i.e. a nondestructive inspection method, which does not damage the weld portion, unlike a conventional inspection method.

DESCRIPTION OF DRAWINGS

FIG. 1 is a perspective view showing the schematic form of a welding inspection apparatus according to an embodiment.

FIG. 2 is a perspective view schematically showing the structure of a thermal imaging camera in a welding inspection apparatus according to another embodiment.

FIG. 3 is a graph showing change in temperature of a negative electrode photographed in a specific area during execution of a specific pattern.

FIG. 4 is a graph showing charge $3\sigma$ specifications and discharge $3\sigma$ specifications of each of a positive electrode and a negative electrode together with a numeric range.

FIG. 5 is a table showing $\Delta T$ obtained from difference images in 0-th frames and 50-th frames after temperatures of wire weld portions welded to negative electrodes of battery cells in specific areas partitioned in a battery module are measured during execution of 10 patterns.

FIG. 6 is a table showing $\Delta T$ obtained from difference images in 0-th frames and 50-th frames after temperatures of wire weld portions welded to positive electrodes of the battery cells in the specific areas partitioned in the battery module are measured during execution of 10 patterns.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Hereinafter, embodiments of the present invention will be described in detail with reference to the accompanying drawings.

FIG. 1 is a perspective view showing the schematic form of a welding inspection apparatus according to an embodiment.

Referring to FIG. 1, the welding inspection apparatus according to the present invention includes a base unit 200 configured to allow a battery module 100, which is an object to be inspected, to be disposed thereon, a positive electrode connector 310 and a negative electrode connector 320 connected to the battery module 100 for charging and discharging of the battery module 100, a thermal imaging camera 400 configured to photograph a weld portion of the battery module 100, and a driving unit 500 configured to move the thermal imaging camera 400.

The battery module 100 includes cylindrical battery cells 101. A top cap of each cylindrical battery cell 101 functions as a positive electrode terminal 110, and a crimping portion thereof functions as a negative electrode terminal 120. A wire 150 made of an electrically conductive material is coupled to the positive electrode terminal 110 and the negative electrode terminal 120 by wire bonding, whereby electrical connection may be achieved.

A material that has excellent electrical conductivity may be used as the wire 150. For example, gold, silver, or copper may be used.

In order to connect the plurality of cylindrical battery cells 101 to each other in series or in parallel, a conductive plate 140 may be used as needed. One end of the wire 150 may be primarily bonded to the electrode terminal, and the other end thereof may be coupled to the conductive plate 140, whereby electrical connection between the plurality of cylindrical battery cells 101 may be achieved.

The cylindrical battery cells may be variously disposed depending on the shape of the conductive plate. As shown in FIG. 1, the top caps of all of the cylindrical battery cells may be disposed so as to face upwards. Alternatively, unlike what is shown in FIG. 1, the top caps of some of the cylindrical battery cells may be disposed so as to face upwards, and the top caps of the other cylindrical battery cells may be disposed so as to face downwards.

Alternatively, the top caps of all of the cylindrical battery cells may be disposed so as to face upwards, parallel connection between the positive electrodes may be achieved by wire bonding on the top caps, and parallel connection between the negative electrodes may be achieved by wire bonding on the bottoms of all of the cylindrical battery cells.

The conductive plate may be used in various shapes without limitation in shape. In general, the conductive plate may be made of an electrically conductive material, for example, a metal, such as aluminum, copper, nickel, iron, or an alloy thereof.

The base unit 200 may have an upper surface that is flat and has a planar area greater than the area of the battery module 100 such that the position of the battery module 100 is fixed without shaking in the state in which the battery module 100 is disposed on the upper surface of the base unit 200. Optionally, an upward protruding structure, such as a side wall, may be formed at the outer edge of the upper surface of the base unit so as to guide the position at which the battery module is disposed.

In addition, the thermal imaging camera 400 configured to photograph the battery module 100 measures the temperature of the weld portion to which the wire 150 is coupled while moving above the battery module 100. The thermal imaging camera 400 may be movable in three axis directions, i.e. an x-axis direction, a y-axis direction, and a z-axis direction, in a state of being coupled to the driving unit 500. The driving unit 500 may be mounted to the base unit 200, or may be a separate structure detached from the base unit 200.

The thermal imaging camera 400 may measure the temperature of the weld portion at each of the positive electrode terminal 110 and the negative electrode terminal 120. The thermal imaging camera continuously measures the temperature of the weld portion during charging and discharging of the battery module in the state in which the positive electrode connector 310 and the negative electrode connector 320 are coupled to the battery module.

As the battery module is repeatedly charged and discharged, the temperature of the battery module tends to be gradually increased. In addition, the difference between the maximum temperature and the minimum temperature may be changed depending on charge and discharge cycles, and sudden temperature change may occur during charging and discharging of the battery module.

Consequently, it is possible to determine whether the weld portion is normal in consideration of such temperature change.

In a concrete example, when the number of cylindrical battery cells received in the battery module is large and thus it is difficult to put all of the cylindrical battery cells on the screen of the thermal imaging camera, the battery module may be partitioned into a plurality of zones, and the thermal imaging camera may measure the temperature of the weld portion at each of the cylindrical battery cells while sequentially moving to the respective zones.

For example, detection logic in one zone using the thermal imaging camera may have "rest-charging-rest-discharging" as one pattern, wherein rest time may be 1 second, and each of charging time and discharging time may be 2 seconds.

Specifically, in the state in which the thermal imaging camera is disposed in a specific zone of the battery module, the temperature of the weld portion may be measured, for example, while the pattern is executed 10 times. That is, the temperature of the weld portion may be measured while 10 times of charging and 10 times of discharging, including rests, are performed. When a predetermined time elapses after the 10 pattern measurement in the specific zone is finished, the thermal imaging camera is moved to the next zone, and the temperature of the weld portion is measured during execution of 10 patterns while charging and discharging are performed in the same manner.

Since charging and discharging are stopped for the predetermined time before the thermal imaging camera is moved to the next zone, the temperatures of the battery cells increased in the previous zone may be reduced to the level before charging and discharging.

The above process may be repeated to measure the temperature of the weld portion at each of the battery cells while the thermal imaging camera is moved to all zones partitioned depending on the size of the battery module and the number of battery cells, whereby it is possible to determine whether the weld portion is defective.

Since the temperature increase range of the weld portion during the first pattern and the second pattern is not large, however, no temperature may be measured during the first pattern and the second pattern, and the temperature measured during the third pattern and subsequent patterns may be used in order to calculate a normal temperature range.

A difference image algorithm may be used as a method of determining whether the temperature of the weld portion measured by the thermal imaging camera is within a normal range. The difference image algorithm is a method of comparing two images in order to find differences therebetween.

In this specification, as reference images, an image before temperature change starts is referred to as a comparative image, and an image having measured temperature increase is referred to as a target image.

Specifically, the thermal imaging camera may photograph 50 frames per second and thus may photograph 100 frames during each of charging and discharging performed for 2 seconds. Hereinafter, an image photographed before charging and discharging are performed will be referred to as a 0-th frame, and an n-th photographed frame, among 100 frames photographed for 2 seconds, will be referred to as an n-th frame.

There is a trend in which, during charging and discharging, sudden temperature increase occurs in the initial stage and the temperature increase range is reduced after the initial stage. On the assumption that, in a graph showing the temperature of each frame, a frame having a reduced inclination is an n-th frame, a 0-th frame becomes a comparative image and the n-th frame becomes a target image, and the position of the maximum temperature pixel may be derived from the difference image therebetween.

Consequently, it is possible to check change in temperature of a specific portion of the outer surface of the battery cell, such as a positive electrode weld portion or a negative electrode weld portion, and deviation in temperature ΔT of the specific portion in the 0-th frame and the n-th frame obtained as described above may be analyzed at a 3σ level, whereby it is possible to derive a normal temperature range of the positive electrode weld portion or the negative electrode weld portion.

The normal temperature range may be derived based on ΔT, which is deviation in temperature of the specific portion in the 0-th frame and the n-th frame, during all patterns in which charging and discharging are performed. When ΔT of the n-th frame of the specific portion measured during execution of all patterns deviates from the normal temperature range, a determination may be made that welding is defective.

In addition, change in temperature of the positive electrode weld portion or the negative electrode weld portion during charging and change in temperature of the positive electrode weld portion or the negative electrode weld portion during discharging may be different from each other, and a normal charge range and a normal discharge range may be calculated at each of the positive electrode and the negative electrode.

When ΔT is calculated based on the frame in which sudden temperature change occurs, as described above, there is an advantage in that probability of incorrect measurement within a temperature measurement range is low.

Alternatively, when the maximum temperature is measured in all periods from a 0-th frame to a 100-th frame, the temperature in the 100-th frame may be the maximum temperature, and therefore there is an advantage in that the maximum temperature change data may be analyzed and utilized.

When the distance between the thermal imaging camera 400 and the wire 150 is increased, the number of pixels that measure one wire is reduced, whereby detection power is remarkably lowered. Consequently, it is necessary to adjust working distance of the thermal imaging camera such that at least two pixels are assigned to each wire.

For example, when wires each having a thickness of 0.5 mm are used, the distance between the thermal imaging camera and each wire may be set to 250 mm such that three pixels are assigned to each wire.

FIG. 1 shows that the thermal imaging camera is moved using the driving unit implemented by an articulated robotic arm.

Two or more thermal imaging cameras may be disposed adjacent to each other. When the thermal imaging cameras photograph the outer surface of the battery module without overlapping each other, it is possible to photograph a wide range, and therefore it is possible to increase inspection speed.

Meanwhile, when thermal imaging cameras corresponding in number to the partitioned zones of the upper surface of the battery module are provided so as to photograph the entire area of the upper surface of the battery module at once, it is possible to measure the temperature of the weld portion during a plurality of patterns in the state in which the thermal imaging cameras are stationary without movement. That is, it is possible to omit time during which charging and discharging are stopped when the thermal imaging cameras are moved to the partitioned zones, whereby it is possible to rapidly inspect defects of all the weld portions.

In a concrete example, the welding inspection apparatus according to the present invention may further include a display unit configured to display change in temperature of the weld portion measured by the thermal imaging camera over time in the form of a graph.

Since the display unit configured to visually display the change in temperature of the weld portion is included, as described above, it is possible to easily and rapidly determine whether the weld portion is defective.

FIG. 2 is a perspective view schematically showing the structure of a thermal imaging camera in a welding inspection apparatus according to another embodiment.

Referring to FIG. 2, a frame 501 is installed on a base unit 210. A battery module (not shown) may be disposed in the frame 501, and a driving unit 510 is mounted to the frame 501 so as to be movable in the x-axis direction.

Two thermal imaging cameras 410 and 420 are mounted to the driving unit 510, and the thermal imaging cameras 410 and 420 may be independently or simultaneously movable along the driving unit 510 in the z-axis direction.

Each of the thermal imaging cameras 410 and 420 may be configured such that the length thereof is increased or decreased in the y-axis direction, and the thermal imaging cameras may be freely movable in the three axis directions, i.e. the x-axis direction, the y-axis direction, and the z-axis direction, depending on the position of weld portions of cylindrical battery cells included in the battery module.

As to detection logic using the thermal imaging cameras 410 and 420 and the other structural elements constituting the welding inspection apparatus, a description given with reference to FIG. 1 may be equally applied to the welding inspection apparatus shown in FIG. 2.

The thermal imaging cameras according to the present invention may extract the temperature of a specific portion from the screen having the photographed temperature of the upper surface of the battery module, and may measure the temperatures of a plurality of specific portions in one frame.

Hereinafter, the present invention will be described with reference to the following example. The example is provided only for easier understanding of the present invention and should not be construed as limiting the scope of the present invention.

Example

A battery module including cylindrical battery cells having electrode terminals electrically connected to each other by wire welding was disposed on a base unit, and then a positive electrode connector and a negative electrode connector were connected to the battery module.

Two thermal imaging cameras were prepared, were fixed to a driving unit, and were disposed above the battery module so as to photograph the electrode terminals. Resolution of each of the two thermal imaging cameras was set such that one wire was displayed on at least two pixels.

FLIR A655sc products were used as the thermal imaging cameras.

Setting was performed such that one thermal imaging camera was capable of measuring 16 battery cells, and therefore the temperatures of 32 battery cells were simultaneously measured using the two thermal imaging cameras.

The same number of battery cells may not be measured in all zones depending on the number of battery cells disposed in the overall width direction and the overall length direction of the battery module. However, the thermal imaging cameras were disposed such that the temperatures of all of the battery cells were measured, and the temperatures of all of the battery cells were measured while moving the thermal imaging cameras.

In the first zone, the temperatures of weld portions were measured using the thermal imaging cameras while charging and discharging were performed during execution of 10 patterns, each of which was constituted by "rest-charging-rest-discharging", including rest periods.

Rest was performed for 1 second, and each of charging and discharging was performed for 2 seconds.

Each thermal imaging camera photographed 50 frames per second and thus photographed 100 frames in 2 seconds.

For all zones, change in temperature of the battery cells was measured while charging and discharging were performed during execution of 10 patterns.

FIG. 3 is a graph showing change in temperature of a negative electrode photographed in a specific area during execution of a specific pattern. Referring to FIG. 3, the horizontal axis indicates frame number, and the vertical axis indicates temperature change. It can be seen that temperature is suddenly increased up to a 50-th frame and the slope of a temperature graph is gentle thereafter.

For all battery cells in all partitioned zones of the battery module, images were captured while charging and discharging were performed during execution of 10 patterns in each zone, difference images in 0-th frames, as comparative images, and 50-th frames, as target images, among the images during execution of all patterns, were calculated, whereby deviation in temperature $\Delta T$ was calculated, and $\Delta T$ was analyzed at a $3\sigma$ level, whereby a normal temperature range of wire weld portions welded to all of the battery cells was derived.

FIG. 4 is a graph showing charge $3\sigma$ specifications and discharge $3\sigma$ specifications of each of a positive electrode and a negative electrode together with a numeric range.

That is, the range of $\Delta T$, within which a determination is made that welding is normal welding, is 0.44° C. to 1.62° C. when the positive electrode is charged, 0.81° C. to 2.44° C. when the positive electrode is discharged, 1.22° C. to 4.41° C. when the negative electrode is charged, and 0.64° C. to 3.16° C. when the negative electrode is discharged. When $\Delta T$ obtained from the difference images deviates from the above range, therefore, a determination is made that the weld portion is defective.

FIG. 5 is a table showing $\Delta T$ obtained from difference images in 0-th frames and 50-th frames after temperatures of wire weld portions welded to negative electrodes of battery cells in specific areas partitioned in the battery module are measured during execution of 10 patterns, and FIG. 6 is a table showing $\Delta T$ obtained from difference images in 0-th frames and 50-th frames after temperatures of wire weld portions welded to positive electrodes of the battery cells in the specific areas partitioned in the battery module are measured during execution of 10 patterns.

Referring to FIG. 5, it can be seen that, according to the criterion when the negative electrode is charged and the criterion when the negative electrode is discharged shown in FIG. 4, temperatures deviating from the normal temperature range were measured at cell 12 and cell 13 by the second camera, excluding the values of the first pattern and the second pattern.

Referring to FIG. 6, according to the criterion when the positive electrode is charged and the criterion when the positive electrode is discharged shown in FIG. 4, the temperature of cell 1 measured by the first camera deviates from the upper limit of the normal temperature range during 10 pattern charging, and the temperature of cell 15 measured by the second camera deviates from the normal temperature range during charging and/or discharging after 5 patterns, excluding the values of the first pattern and the second pattern.

A determination is made that the battery cell having the temperature deviating from the normal temperature range, as described above, is defective, and the battery cell is removed, whereby it is possible to prevent a problem arising from a finished product including a defective battery cell.

In addition, when the welding inspection apparatus according to the present invention is used, it is possible to determine whether the weld portion is defective using a nondestructive inspection method.

Those skilled in the art to which the present invention pertains will appreciate that various applications and modifications are possible within the category of the present invention based on the above description.

DESCRIPTION OF REFERENCE NUMERALS

100: Battery module
101: Cylindrical battery cell
110: Positive electrode terminal
120: Negative electrode terminal
140: Conductive plate
150: Wire
200, 210: Base units
310: Positive electrode connector
320: Negative electrode connector
400, 410, 420: Thermal imaging cameras
500, 510: Driving units
501: Frame

The invention claimed is:

1. A welding inspection apparatus comprising:
a base unit configured to dispose thereon a battery module, as an object to be inspected;
a positive electrode connector and a negative electrode connector connected so as to charge and discharge the battery module;
a thermal imaging camera configured to photograph a weld portion of the battery module; and
a driving unit configured to move the thermal imaging camera,
wherein the welding inspection apparatus uses a difference image algorithm as a method of determining whether a temperature of the weld portion measured by the thermal imaging camera is within a normal temperature range,
wherein the difference image algorithm includes charging and discharging the battery module while acquiring, by the thermal imaging camera, a plurality of frames of the weld portion of the battery module, and
wherein the normal temperature range corresponds to a range within three standard deviations ($3\sigma$) of a deviation in temperature ($\Delta T$) measured from the weld portion.

2. The welding inspection apparatus according to claim 1, wherein the battery module comprises battery cells.

3. The welding inspection apparatus according to claim 2, wherein:

the battery cells are electrically connected to each other by a wire bonding, and the thermal imaging camera measures the temperature of the weld portion at each of a positive electrode terminal and a negative electrode terminal of each of the battery cells.

4. The welding inspection apparatus according to claim 1, wherein the battery module is charged and discharged two or more times.

5. The welding inspection apparatus according to claim 1, wherein the thermal imaging camera is provided in two or more so as to be disposed adjacent to each other.

6. The welding inspection apparatus according to claim 1, wherein the thermal imaging camera is movable by the driving unit in three axis directions comprising an x-axis direction, a y-axis direction, and a z-axis direction.

7. The welding inspection apparatus according to claim 1, wherein the thermal imaging camera photographs the weld portion while moving above the battery module in a state in which the battery module is disposed on the base unit.

8. The welding inspection apparatus according to claim 1, wherein the normal temperature range is derived based on a difference in temperature between a frame having no temperature increase and a specific frame, among the plurality of frames measured by the thermal imaging camera.

9. The welding inspection apparatus according to claim 8, wherein the specific frame is a frame having a sudden temperature change, among all of the plurality of frames.

10. The welding inspection apparatus according to claim 8, wherein a normal charge range and a normal discharge range are derived from each of a positive electrode weld portion and a negative electrode weld portion as the normal temperature range.

11. The welding inspection apparatus according to claim 2, wherein the battery cells are cylindrical.

12. The welding inspection apparatus according to claim 1, wherein the thermal imaging camera photographs the weld portion at about 50 frame per second.

13. The weld inspection apparatus according to claim 1, wherein the deviation in temperature ($\Delta T$) is the deviation in the temperature of a specific portion the weld portion in a 0-th frame and a n-th frame during charging and discharging of the battery module.

* * * * *